Jan. 29, 1935.   A. L. HOWARD   1,989,276
UPHOLSTERY MOLDING
Filed Dec. 10, 1929

INVENTOR.
Albert L. Howard.
by H. W. Fenway. Atty

Patented Jan. 29, 1935

1,989,276

UNITED STATES PATENT OFFICE 1,989,276

UPHOLSTERY MOLDING

Albert L. Howard, Brockton, Mass., assignor to Hamilton-Wade Company, Brockton, Mass., a corporation of Massachusetts Application December 10, 1929, Serial No. 413,039

4 Claims. (Cl. 155—184)

This invention relates to upholstery molding for use in connection with upholstery of all sorts, but particularly in the finish of automobiles where it is desired to combine strength and convenience in laying with an attractive appearance. In laying upholstery molding upon curved surfaces and in locations difficult of access, it is desirable that the molding should readily conform to the surface to which it is to be attached and should remain as initially located without tending to spring out of position before the attaching nails can be driven to hold it permanently in place. In one aspect, my invention comprises upholstery molding of novel construction possessing this qualification in a marked degree. Another desirable qualification of the molding of my invention is that it lies close throughout its entire length of its supporting surface without tendency to form bridges or loops between the attaching nails. The appearance of the molding, moreover, is improved if the heads of the attaching nails are concealed in the finished work. My invention contemplates, further, a novel molding so constructed as to facilitate blind nailing without the necessity of picking the cover of the molding to free the nail heads. From this standpoint, my invention consists in a molding comprising a rubber body strip having a longitudinal channel formed in its upper surface and a fabric covering for the body strip bridging said channel and concealing the latter entirely in the finished molding. In attaching the molding, the channel may be found with the point of the attaching nail and when the latter is driven the covering is temporarily carried down into the channel but it is tensioned sufficiently upon the surface of the molding to cause the head of the attaching nail to pull through the covering with little or no assistance, so that the molding reassumes its original contour and the covering presents no indication that an attaching nail has been driven through it.

In order to impart to the molding the desirable qualities above mentioned in respect to convenience in laying and in remaining flat between attaching nails, I embed within the body of the molding a flexible metallic reinforcement such as a wire, preferably of untempered steel, which will readily take any curvature imparted to the molding as a whole and tend to maintain the molding flat between such nails. The reinforcing wire may be embodied directly in the rubber body portion of the molding or in a core of flexible non-resilient material which may be arranged in coextensive relation with the body strip or enclosed thereby and which is useful in affording additional anchorage for the attaching nails.

These and other features of the invention will be best understood and appreciated from the following description of preferred embodiments thereof, selected for purposes of illustration and shown in the accompanying drawing, in which Fig. 1 is a fragmentary view in perspective showing the rubber body strip molded about a core having reinforcing wires;

As illustrated in Figs. 1 to 5, the molding comprises a rubber body strip 12 having a flat lower surface and an upper surface substantially semi-circular in contour and provided with a central longitudinally extending channel 14. The channel 14 is preferably symmetrically arranged in the body strip and has a curved bottom, and is of sufficient depth to contain the heads of the attaching nails. The body strip 12 is molded entirely about a wide flat core 16, in which are embedded two reinforcing wires 18 arranged symmetrically in the core in parallel relation and spaced from each other so as to lie outside the path of the attaching nails to be driven in the channel 14. The core 16 may be of any flexible non-resilient material suitable to afford firm anchorage for the attaching nails and to maintain whatever position may be imparted to the molding as a whole in laying the same. The reinforcing wires 18 are preferably also flexible and non-resilient as, for example, untempered steel.

Figure 1:
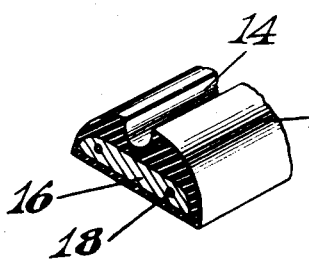
Figure 2:
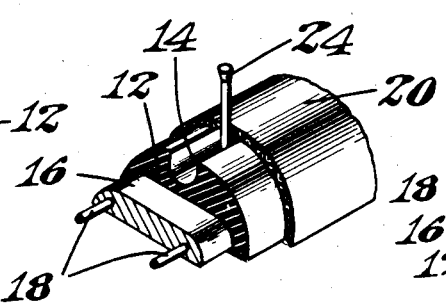
Fig. 2 is a similar view showing in addition the covering.
Figure 3:
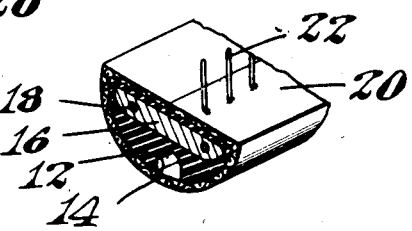
Fig. 3 is a similar view in inverted position.

The molding is completed by a covering 20 of textile material which encases the rubber body strip 12, conforming to the general contour thereof and bridging the channel 14 so as to conceal the latter completely. The edges of the covering 20 are brought together on the lower face of the molding, as shown in Fig. 3, and are secured in place in any desired manner, as by a seam 22. The covering is thus secured tightly and smoothly in place and with a sufficient tension to cause it always to bridge the channel 14 without showing a trace of the walls of the channel.

Figure 4:
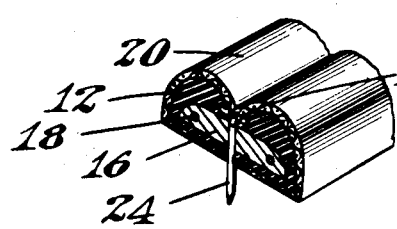
Fig. 4 is a similar view showing an attaching nail driven and temporarily deflecting the covering.
Figure 5:
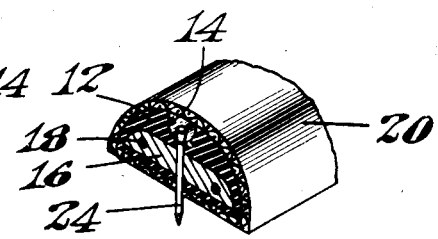
Fig. 5 is a similar view showing the position of an attaching nail in the attached molding.

In attaching the molding, the location of the channel may be easily found by the point of the attaching nail 24 and the latter is then driven vertically through the rubber body strip 12 and the core 16, between the wires 18 and into the surface on which the molding is to be attached. In this operation the covering 20 is temporarily carried down into the channel 14, which is also temporarily deformed as indicated in Fig. 4. When the attaching nail has been completely driven, however, the tension of the covering 20 and the resilient action of the body strip 12 is sufficient to draw the tapering head of the nail 24 entirely through the material of the covering. The molding thereupon reassumes its original condition, as shown in Fig. 5, with the covering 20 smoothly concealing the channel and the head of the attaching nail which is located within it. It will be apparent that the reinforcing wires 18 and the core supply an element of strength and stiffness to the complete molding which is extremely effective in holding it flat upon the surface to which it is attached and preventing bulging or looseness between the attaching nails.

Figure 6:
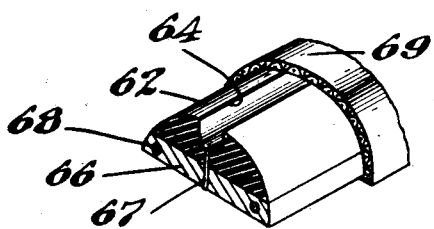
Fig. 6 is a fragmentary view in perspective of a modified form of molding.

In Fig. 6 is illustrated an alternative form of molding in which the core 66 with the reinforcing wires 68 is not embedded in the body strip 62 but arranged to underlie it and is secured thereto by a line of stitching 67 located in the bottom of the channel 64. The covering 69 smoothly encases the core and rubber strip and is secured in place with its edges beneath the core by stitching, cement or otherwise. The stitching 67 in no ways interferes with the driving of the attaching nails and the construction illustrated presents substantially all the advantages of the form of molding just described.

Figure 7:
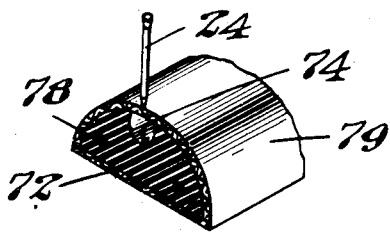
Fig. 7 is a similar view of a modified form of molding having an integral rubber core.

In Fig. 7 is illustrated another alternative form of molding, in which the core or filler comprises an integral body strip 72 of rubber having a flat lower surface and an upper surface of semicircular contour in which is formed a longitudinally extending channel 74. Reinforcing wires 78 are embedded in the body strip 72, being located in spaced relation symmetrically and out of line with the channel 74. The covering 79 is secured smoothly upon the body strip 72, its edges being brought together on the lower surface thereof and secured either by stitching or by cement.

Figure 8:
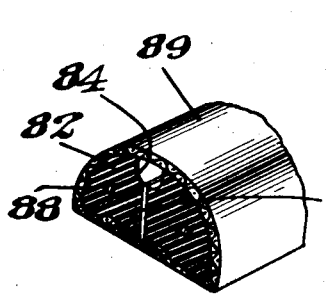
Figs. 8, 9 and 10 are similar views of a molding having the covering attached in an alternative manner.
Figure 9:
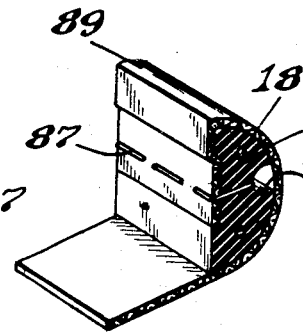
Figure 10:
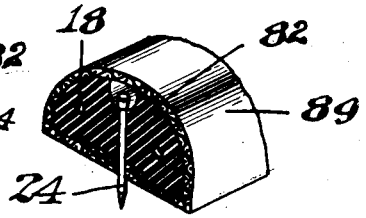

In Figs. 8, 9 and 10 is illustrated an upholstery molding similar to that shown in Fig. 7 but having its covering secured in a different manner. In this form of molding the rubber body strip 82 is provided in its upper surface with a channel 84 and in its lower surface with a wide flat channel located symmetrically beneath the channel 84. Reinforcing wires 88 are provided in the body strip 82. The covering 89 is located upon the molding with one edge inserted in the flat channel in the lower face of the body strip and this edge is secured in place by a line of stitching 87 placed in the channel 84 and extending through the body of the strip 82. The material of the covering is then wrapped around the body strip 82 and its unsecured edge lapped over the stitched edge, butting against the shoulder formed in the covering at the edge of the shallow channel and forming a flat bottom for the molding. It will be apparent that in laying this molding the attaching nail 24 driven in the channel will pass through both edges of the covering, thus holding it in place with great security.

While the body strip has been referred to in the foregoing description as a rubber strip, it will be apparent that any rubber compound or other resilient material would serve as well and would be within the scope of the invention. Various materials also may be used in making up the core 16, it being essential only that this should be flexible and non-resilient in its characteristics and afford satisfactory anchorage for the attaching nails. The core may be made of molded paper pulp or of a close-braided paper twine with good advantage.

Having thus described my invention, what I claim as new and desire to secure by Letters Patent of the United States is:

1. Upholstery molding comprising a rubber body strip having a channel in its upper surface, a flexible non-resilient core coextensive with said body strip and having reinforcing wires therein, and a textile covering enclosing both the body strip and core and fastened so as to bridge said channel at all times and provide a free space beneath the covering for the head of a fastening.

2. Upholstery molding comprising a flexible non-resilient core having a reinforcing wire therein, a rubber body strip molded about the surfaces of said core, enclosing the same and having a channel in its upper surface, and a textile covering encasing the body strip and secured in position to bridge the channel.

3. Upholstery molding comprising a flat, flexible non-resilient core having a pair of reinforcing wires embedded therein in parallel spaced relation, a rubber body strip molded about said core with a thick transversely curved portion above the core in which is formed a longitudinal channel, and a textile covering fitting about said body strip, bridging the channel and having its edges connected beneath the molding.

4. In an upholstery molding, a flexible non-resilient core having an elongated flexible metallic reinforcing member, and a rubber body strip molded about the surface of said core enclosing the same and having a channel in its upper surface for the reception of attaching nails.

ALBERT L. HOWARD.